US011837080B2

(12) United States Patent
Kasahara et al.

(10) Patent No.: US 11,837,080 B2
(45) Date of Patent: *Dec. 5, 2023

(54) INFORMATION PROCESSING SYSTEM, INFORMATION PROCESSING METHOD, MANAGEMENT DEVICE, AND PROGRAM

(71) Applicant: NIPPON TELEGRAPH AND TELEPHONE CORPORATION, Tokyo (JP)

(72) Inventors: Hisatoshi Kasahara, Tokyo (JP); Norihiro Fujimoto, Tokyo (JP); Hitoshi Mizuno, Tokyo (JP); Seiya Sato, Tokyo (JP); Kazuhiko Goto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 75 days.

This patent is subject to a terminal disclaimer.

(21) Appl. No.: 17/436,029

(22) PCT Filed: Feb. 25, 2020

(86) PCT No.: PCT/JP2020/007291
§ 371 (c)(1),
(2) Date: Sep. 2, 2021

(87) PCT Pub. No.: WO2020/179528
PCT Pub. Date: Sep. 10, 2020

(65) Prior Publication Data
US 2022/0005330 A1    Jan. 6, 2022

(30) Foreign Application Priority Data
Mar. 5, 2019 (JP) ................................. 2019-039942

(51) Int. Cl.
*G08B 7/06* (2006.01)
*G01S 5/02* (2010.01)
(Continued)

(52) U.S. Cl.
CPC ............ *G08B 7/06* (2013.01); *G01S 5/02695* (2020.05); *G01S 5/14* (2013.01); *H04Q 9/00* (2013.01)

(58) Field of Classification Search
CPC ....... G08B 7/06; G08B 21/22; G01S 5/02695; G01S 5/14; G01S 1/68; G01S 11/06; H04Q 9/00; G08G 1/16
See application file for complete search history.

(56) References Cited

U.S. PATENT DOCUMENTS 11,126,193 B2 *   9/2021   Mannefred .......... G05D 1/0234
2021/0181751 A1 * 6/2021   Kumagai ................. H04Q 9/00

FOREIGN PATENT DOCUMENTS

JP    2003299140 A   *   10/2003
JP    2003299140 A       10/2003
(Continued)

OTHER PUBLICATIONS

Mirait Corporation and Mirait Holdings Corporation (2016) "Development of vehicle dive warning system 'Doremi R'—Contributing to reducing damage caused by accidents resulting in injury or death due to vehicle dive into construction restricted areas-" literature [online] Oct. 19, 2016, website: https://www.mirait.co.jp/news/upload_files/20161019.pdf.

*Primary Examiner* — Amine Benlagsir

(57) ABSTRACT

An object is to estimate the course of a movable terminal device. An information processing system (S) includes a plurality of transmission devices (1a, 1b) capable of transmitting predetermined radio waves, a terminal device (2) capable of receiving the predetermined radio waves, and a management device (3) communicably connected to the (Continued)

terminal device. The terminal device (2) measures intensities of radio waves received from the transmission devices (1a, 1b) at predetermined times, and transmits measurement results to the management device (3). The management device (3) calculates distances between the terminal device (2) and each of the transmission devices (1a, 1b) at the predetermined times from the measurement results, and calculates positions of the terminal device (2) at the predetermined times from the calculated distances.

13 Claims, 22 Drawing Sheets

(51) Int. Cl.
    *G01S 5/14*     (2006.01)
    *H04Q 9/00*     (2006.01)

(56) References Cited

FOREIGN PATENT DOCUMENTS

| | | | | |
|---|---|---|---|---|
| JP | 2006291502 | A | * | 10/2006 |
| JP | 2006291502 | A | | 10/2006 |

* cited by examiner

Fig. 8

|  | FIRST TRANSMISSION DEVICE | | SECOND TRANSMISSION DEVICE | |
|---|---|---|---|---|
|  | RADIO WAVE INTENSITY(dB) | CALCULATED DISTANCE(m) | RADIO WAVE INTENSITY(dB) | CALCULATED DISTANCE(m) |
| FIRST TIME | −76 | 4.80 | −77 | 5.21 |
| SECOND TIME | −77 | 5.21 | −76 | 4.80 |
| THIRD TIME | −77 | 5.21 | −77 | 5.21 |
| FOURTH TIME | −76 | 4.80 | −76 | 4.80 |
| AVERAGE |  | 5.01 |  | 5.01 |

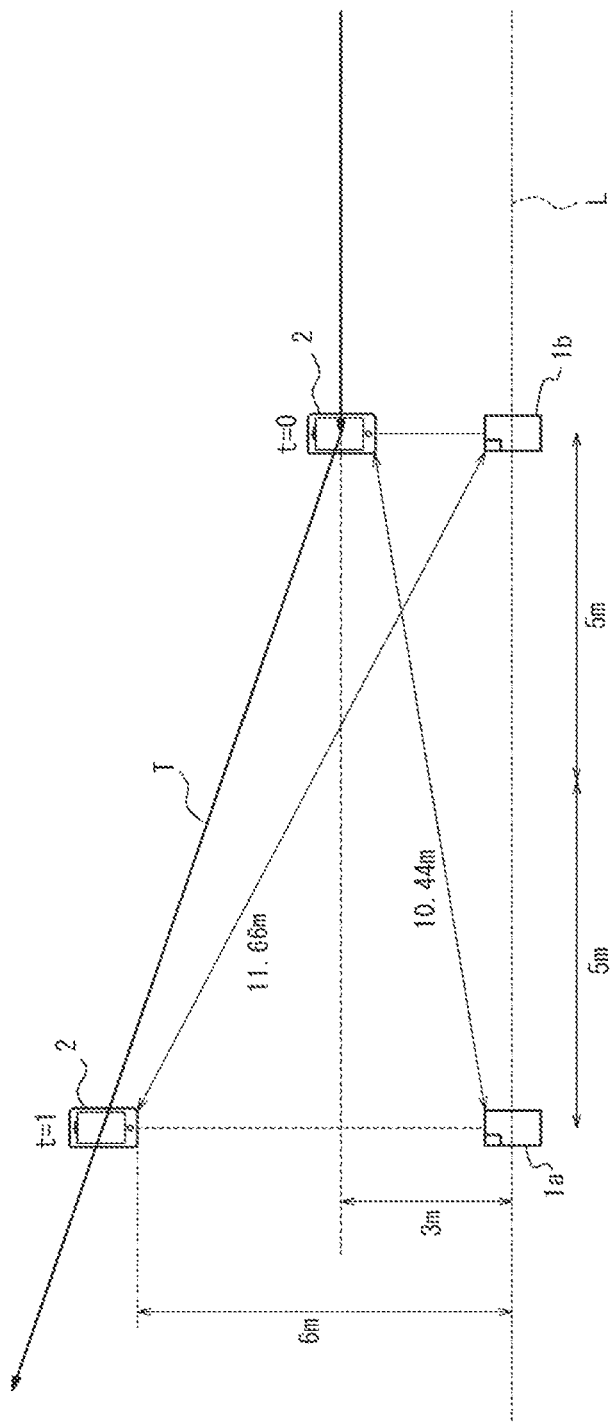

Fig. 10B

| TIME(s) | FIRST TRANSMISSION DEVICE | | | SECOND TRANSMISSION DEVICE | | |
|---|---|---|---|---|---|---|
| | ACTUAL DISTANCE (CALCULATION VALUE) | RADIO WAVE INTENSITY(dB) | CALCULATED DISTANCE(m) | ACTUAL DISTANCE (CALCULATION VALUE) | RADIO WAVE INTENSITY(dB) | CALCULATED DISTANCE(m) |
| 0 | 10.44 | -85 | 10.08 | 3 | -71 | 3.18 |
| 1 | 6 | -79 | 6.15 | 11.66 | -87 | 11.89 |

Fig. 13B

| TIME(s) | x-COORDINATE | y-COORDINATE |
|---|---|---|
| 0 | 4.55 | 3.23 |
| 1 | -5.12 | 6.15 |
| ELAPSED TIME(s) | DISTANCE BETWEEN TWO POINTS(m) ||
| 1 | 11.3 ||
| SPEED(m/s) |||
| 11.3 |||
| SPEED(km/h) |||
| 40.6 |||

INFORMATION PROCESSING SYSTEM, INFORMATION PROCESSING METHOD, MANAGEMENT DEVICE, AND PROGRAM

CROSS-REFERENCE TO RELATED APPLICATIONS

This application is a U.S. 371 Application of International Patent Application No. PCT/JP2020/007291, filed on 25 Feb. 2020, which application claims priority to and the benefit of JP Application No. 2019-039942, filed on 5 Mar. 2019, the disclosures of which are hereby incorporated herein by reference in their entireties.)

TECHNICAL FIELD

The present invention relates to an information processing system, an information processing method, a management device, and a program.

BACKGROUND ART

When paving a road or inspecting or repairing infrastructure under a road, for example, it is necessary to set a work zone on the road to perform the work. At this time, a traffic guide, a traffic sign, or the like needs to be arranged to control the traffic so that vehicles can properly pass the road. On the other hand, in spite of such efforts, there are many cases in which a vehicle accidentally collides with the work zone resulting in injury or death. Most of such accidents are caused due to the driver's lack of attention or dozing. A system (e.g., NPL 1) is known that detects a vehicle travelling at a high speed in a lane in which a road work is being done and gives a warning to a traffic guide or a worker using sound and light to reduce such accidents resulting in injury or death.

CITATION LIST

Non Patent Literature

[NPL 1] MIRAIT, "Rushing in vehicle warning system "Do Re Mi (registered trademark)" was developed, contribution to reduction in injuries and deaths due to vehicle rushing into road work regulation area" [online], Oct. 19, 2016, [searched on Feb. 19, 2019], Internet (URL: https://www.mirait.co.jp/news/upload_files/20161019.pdf)

SUMMARY OF THE INVENTION

Technical Problem

The technology described in NPL 1 is applicable to only a single leading vehicle, and cannot be applied to following vehicles. Therefore, there is a need for a system that discerns approach of a vehicle that is likely to collide in advance, and gives a warning to a worker of a road work.

The present invention was made in view of the foregoing and has an object of providing an information processing system, an information processing method, a management device, and a program with which a course of a movable terminal device can be estimated.

Means for Solving the Problem

To solve the problem described above, an information processing system according to the present invention is an information processing system including:

a plurality of transmission devices capable of transmitting predetermined radio waves;
a terminal device capable of receiving the predetermined radio waves; and
a management device communicably connected to the terminal device,
wherein the terminal device measures intensities of radio waves received from the transmission devices at predetermined times, and transmits measurement results to the management device, and
the management device calculates distances between the terminal device and each of the transmission devices at the predetermined times from the measurement results, and calculates positions of the terminal device at the predetermined times from the calculated distances.

To solve the problem described above, an information processing method according to the present invention is an information processing method to be executed in an information processing system that includes a plurality of transmission devices capable of transmitting predetermined radio waves, a terminal device capable of receiving the predetermined radio waves, and a management device communicably connected to the terminal device, the information processing method including:

measuring, by the terminal device, intensities of radio waves received from the transmission devices at predetermined times, and transmitting, by the terminal device, measurement results to the management device; and
calculating, by the management device, distances between the terminal device and each of the transmission devices at the predetermined times from the measurement results, and calculating, by the management device, positions of the terminal device at the predetermined times from the calculated distances.

To solve the problem described above, a management device according to the present invention is a management device to be communicably connected to a terminal device, wherein the management device
receives measurement results of radio wave intensities at predetermined times from the terminal device, and
calculates distances between the terminal device and each of a plurality of transmission devices at the predetermined times from the measurement results, and calculates positions of the terminal device at the predetermined times from the calculated distances.

To solve the problem described above, a program according to the present invention causes a computer to function as the management device described above.

Effects of the Invention

With the information processing system, the information processing method, the management device, and the program according to the present invention, a course of a movable terminal device can be estimated.

BRIEF DESCRIPTION OF DRAWINGS

FIG. 8 is a diagram showing radio wave intensities and distances obtained through the confirmation experiment.

FIG. 10A is a diagram showing an arrangement of articles used in the confirmation experiment.

FIG. 10B is a diagram showing distances between a terminal device and each transmission device at predetermined times obtained through the confirmation experiment.

FIG. 13B is a diagram showing a distance and a speed calculated under the conditions shown in FIG. 13A.

DESCRIPTION OF EMBODIMENTS

Figure 1:
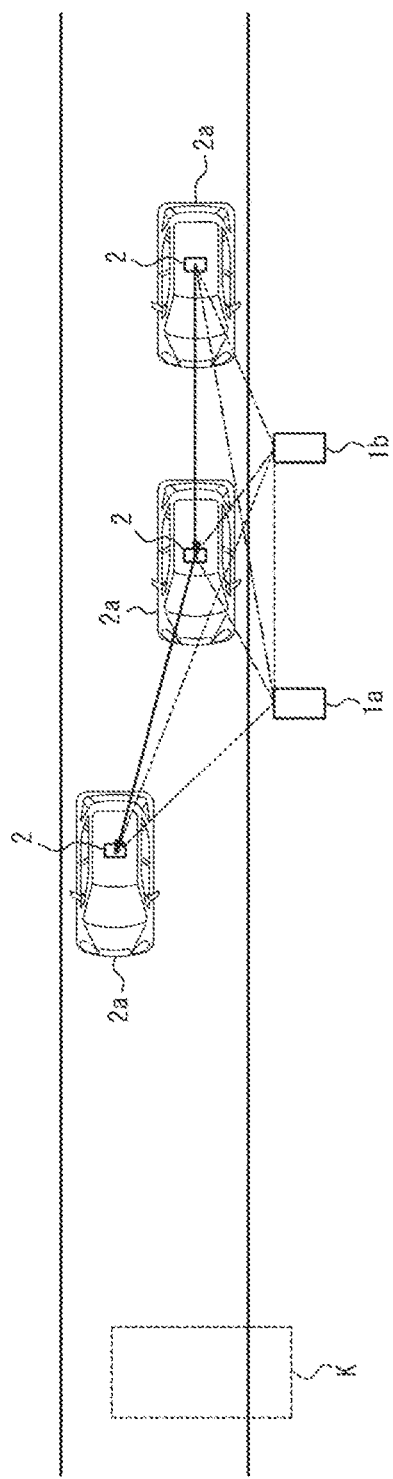
FIG. 1 is a schematic diagram of an embodiment of the present invention.

First, an overview of processing executed in the present embodiment will be described. As shown in FIG. 1, an example of a terminal device 2 in the present embodiment is a smartphone of a driver of a moving object 2a such as a vehicle. The terminal device 2 may be installed in the moving object 2a. The terminal device 2 is movable. The terminal device 2 has Bluetooth (registered trademark) reception functions. Transmission devices 1 (a first transmission device 1a and a second transmission device 1b) in the present embodiment are beacons that are installed on a roadside in the vicinity of a work zone K and can transmit Bluetooth (registered trademark) radio waves. For example, beacons described in the following document can be used.

WHERE, "EXBeacon platform", [online], [searched on Feb. 19, 2019], Internet (URL: https://where123.jp/platform)

Figure 2A:
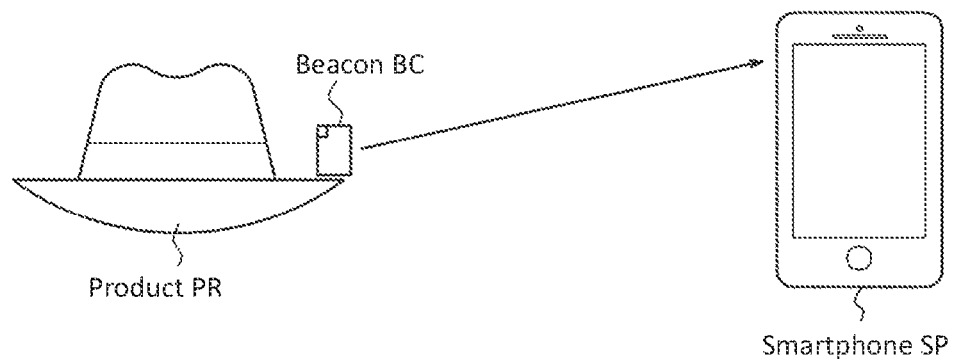
FIG. 2A is a diagram showing a first example of use of a transmission device.
Figure 2B:
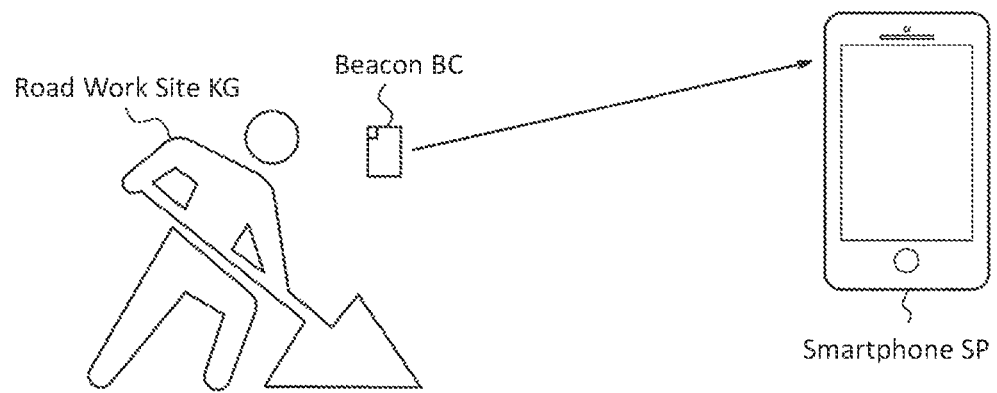
FIG. 2B is a diagram showing a second example of use of the transmission device.

FIGS. 2A and 2B are diagrams showing examples of use of a beacon BC. As shown in FIG. 2A, the beacon BC may be installed in the vicinity of a product PR in a store. In this case, the beacon BC can transmit detailed information regarding the product and the like to a smartphone SP of a customer who comes to a predetermined distance from the beacon BC. The smartphone SP can display the detailed information regarding the product and the like using an application. On the other hand, as shown in FIG. 2B, the beacon BC may be applied to a road work site KG. Specifically, the beacon BC is installed in the road work site KG and transmits a notification to a smartphone SP of a driver of a moving object that comes close to the road work site KG. Upon receiving the notification, the smartphone SP outputs audio such as "There is a road work site. Be careful." using an application, for example.

The following description will be given referring to FIG. 1 again. The terminal device 2 receives Bluetooth (registered trademark) radio waves from each of the first transmission device 1a and the second transmission device 1b at predetermined times, and measures intensities of the radio waves. The terminal device 2 transmits measurement results to a management device 3 (not shown). The management device 3 estimates a distance from each transmission device 1 to the terminal device 2 through calculation based on a relationship between a radio wave intensity and a distance. The management device 3 calculates coordinates of the terminal device 2 from a distance between the transmission devices 1 and distances between the terminal device 2 and the transmission devices 1. The management device 3 calculates a speed of the terminal device 2 from a change in the calculated coordinates with time.

As described above, the management device 3 calculates coordinates of the terminal device 2 using at least two transmission devices 1. The management device 3 can determine a lane in which the moving object 2a is travelling, from the calculated coordinates, and determine whether or not to output warning information using audio, screen display, or the like. Furthermore, the management device 3 can acquire position information and speed information regarding the moving object 2a. The management device 3 can determine the possibility of the moving object 2a colliding with the work zone K, for example, from the acquired information, and output warning information indicating that the possibility of colliding is high, using audio, screen display, or the like. The work zone K is an obstacle on a travelling route of the moving object 2a. Thus, the management device 3 can alert the driver or a worker or the like in the road work site. The present invention can be applied not only to determine the possibility of collision of a vehicle but also to know the speed and the position of various other moving objects.

The following describes details of an information processing method carried out in the present embodiment.

[Step A1]

Figure 3A:
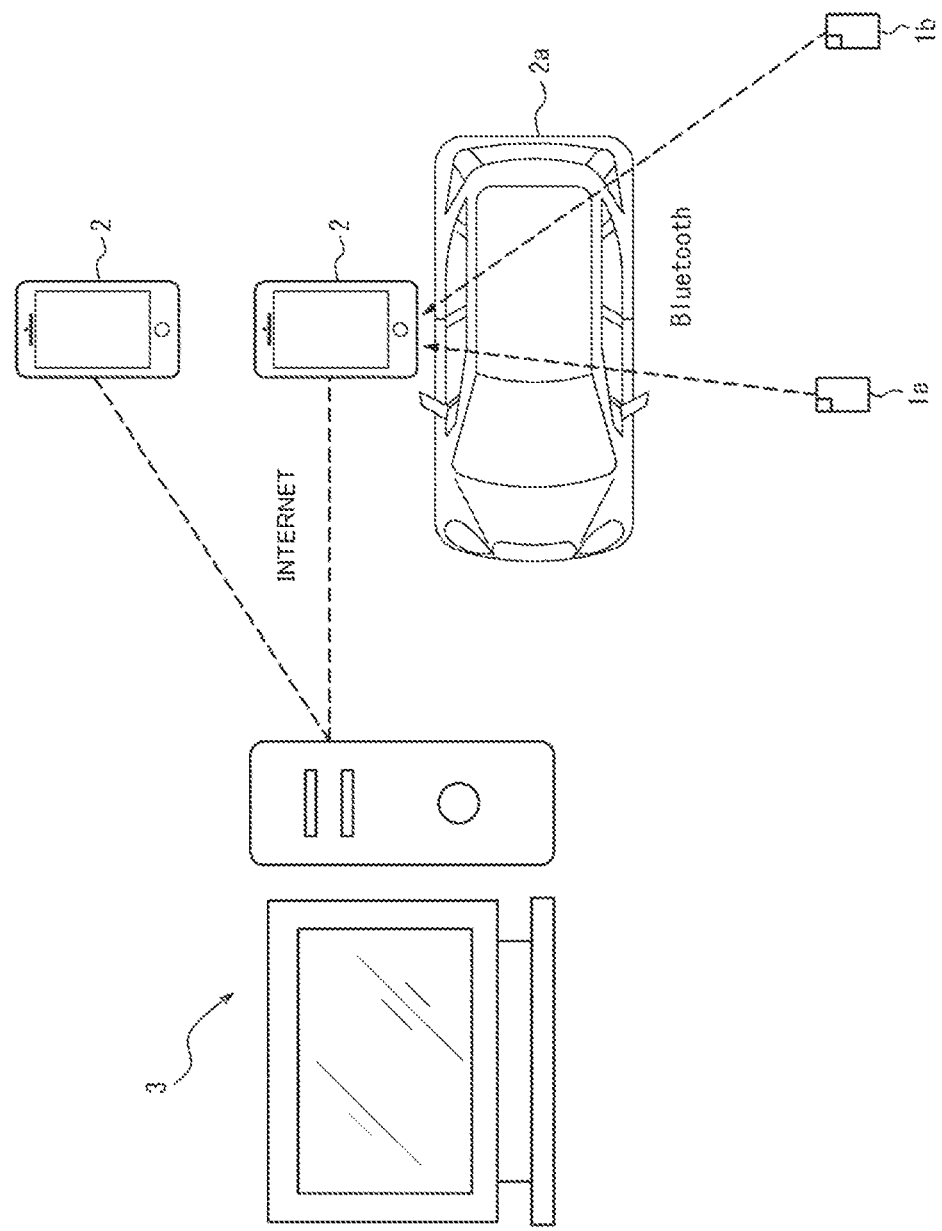
FIG. 3A is a schematic diagram of an information processing system.

FIG. 3A is a diagram showing a main configuration of an information processing system S according to the present embodiment. The information processing system S includes the first transmission device 1a, the second transmission device 1b, terminal devices 2, and the management device 3. Each terminal device 2 is held by a pedestrian or a driver or the like of a moving object 2a. The terminal devices 2 can receive Bluetooth (registered trademark) radio waves, for example, from the first transmission device 1a and the second transmission device 1b. Each terminal device 2 and the management device 3 are communicably connected to each other via a suitable network such as the Internet.

The two transmission devices 1a and 1b are shown in FIG. 3A for the sake of convenience of description. However, the information processing system S may include three or more transmission devices 1. The two terminal devices 2 are shown in FIG. 3A. However, the number of terminal devices 2 included in the information processing system S may be one or three or more. The single management device 3 is shown in FIG. 3A. However, the information processing system S may include two or more management devices 3.

Functional block diagrams of each terminal device 2 and the management device 3 will be described below in detail.

Although functions of the terminal device 2 and the management device 3 are described in detail, the description is not intended to exclude other functions.

Figure 3B:
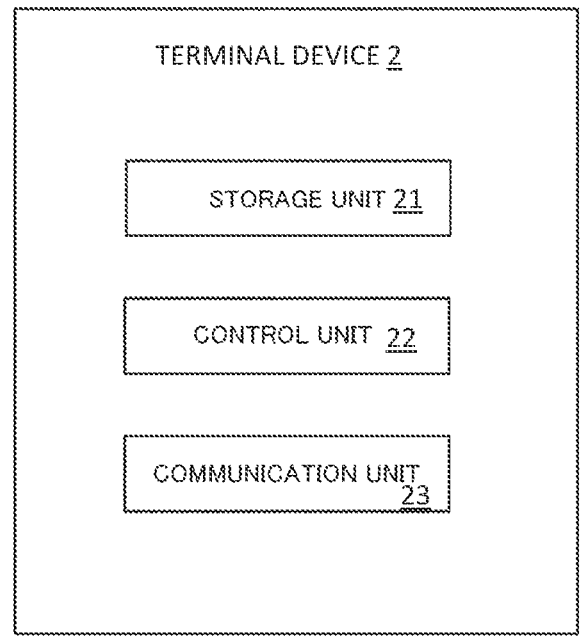
FIG. 3B is a functional block diagram of a terminal device.

As shown in FIG. 3B, the terminal device 2 includes a storage unit 21, a control unit 22, and a communication unit 23. The terminal device 2 is a Bluetooth (registered trademark) reception terminal (e.g., smartphone) held by the driver of the moving object 2a. An application is installed in the terminal device 2. The terminal device 2 measures the intensity of received Bluetooth (registered trademark) radio waves using the application and transmits a measurement result to the management device 3. The terminal device 2 may be held by a pedestrian or a vehicle such as an automobile or a motorcycle.

The storage unit 21 includes at least one memory. Examples of the "memory" include a semiconductor memory, a magnetic memory, and an optical memory, but there is no limitation thereto. Each memory included in the storage unit 21 may function as a main storage device, an auxiliary storage device, or a cash memory, for example. The storage unit 21 may store information regarding a result of analysis or processing performed by the control unit 22. The storage unit 21 may store various types of information and the like relating to operations or control of the terminal device 2.

The control unit 22 includes at least one processor. The "processor" may be a general-purpose processor or a dedicated processor for specific processing. The control unit 22 controls operations of the entirety terminal device 2, for example. The control unit 22 controls other functional units included in the terminal device 2.

The communication unit 23 is an interface and includes a communication module that performs communication with at least one of the first transmission device 1a, the second transmission device 1b, and the management device 3. The communication unit 23 can receive radio waves from the first transmission device 1a or the second transmission device 1b and transmit results of measurement of radio wave intensities to the management device 3.

Figure 3C:
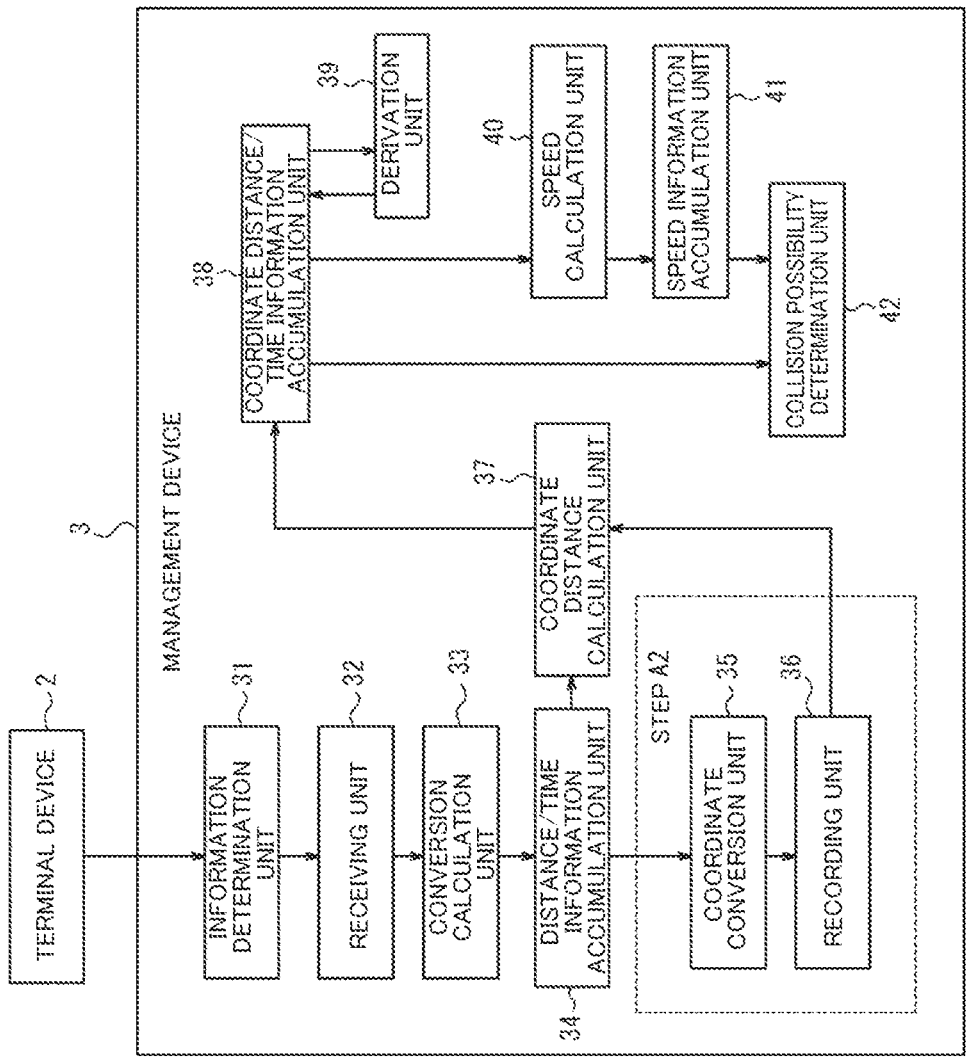
FIG. 3C is a functional block diagram of a management device.

As shown in FIG. 3C, the management device 3 includes an information determination unit 31, a receiving unit 32, a conversion calculation unit 33, a distance/time information accumulation unit 34, a coordinate conversion unit 35, a recording unit 36, a coordinate distance calculation unit 37, a coordinate distance/time information accumulation unit 38, a derivation unit 39, a speed calculation unit 40, a speed information accumulation unit 41, and a collision possibility determination unit 42. Processing that is executed by the information determination unit 31, the conversion calculation unit 33, the coordinate conversion unit 35, the coordinate distance calculation unit 37, the derivation unit 39, the speed calculation unit 40, and the collision possibility determination unit 42 is executed by one or more processors. The distance/time information accumulation unit 34, the recording unit 36, the coordinate distance/time information accumulation unit 38, and the speed information accumulation unit 41 may be at least one memory.

Upon receiving radio wave intensity information and time information from a terminal device 2, the information determination unit 31 determines whether the terminal device 2 from which the information has been received is a terminal device 2 that is used in defining coordinates, which will be described later, or a terminal device 2 that is installed in a moving object 2a.

The receiving unit 32 is an interface that receives information from the information determination unit 31.

The conversion calculation unit 33 convers a radio wave intensity to a distance using a predetermined formula.

The distance/time information accumulation unit 34 accumulates results of calculation performed by the conversion calculation unit 33.

The coordinate conversion unit 35 converts a positional relationship between the terminal device 2 and each transmission device 1 to coordinates in step A2, which will be described later.

The recording unit 36 records coordinates that are defined with respect to the terminal device 2 and each transmission device 1.

The coordinate distance calculation unit 37 calculates a distance between the terminal device 2 and each transmission device 1 in a coordinate system.

The coordinate distance/time information accumulation unit 38 accumulates calculated distances in association with time information received from the terminal device 2.

The derivation unit 39 derives intersection point coordinates from an intersection point between a plurality of circles that are drawn as described below with respect to each point in time, and outputs the intersection point coordinates to the coordinate distance/time information accumulation unit 38.

The speed calculation unit 40 calculates a moving speed of the terminal device 2 from a plurality of derived intersection point coordinates.

The speed information accumulation unit 41 accumulates calculated moving speeds.

The collision possibility determination unit 42 determines the possibility of collision from speed information acquired from the speed information accumulation unit 41 and position information acquired from the coordinate distance/time information accumulation unit 38.

[Step A2]

Figure 4:
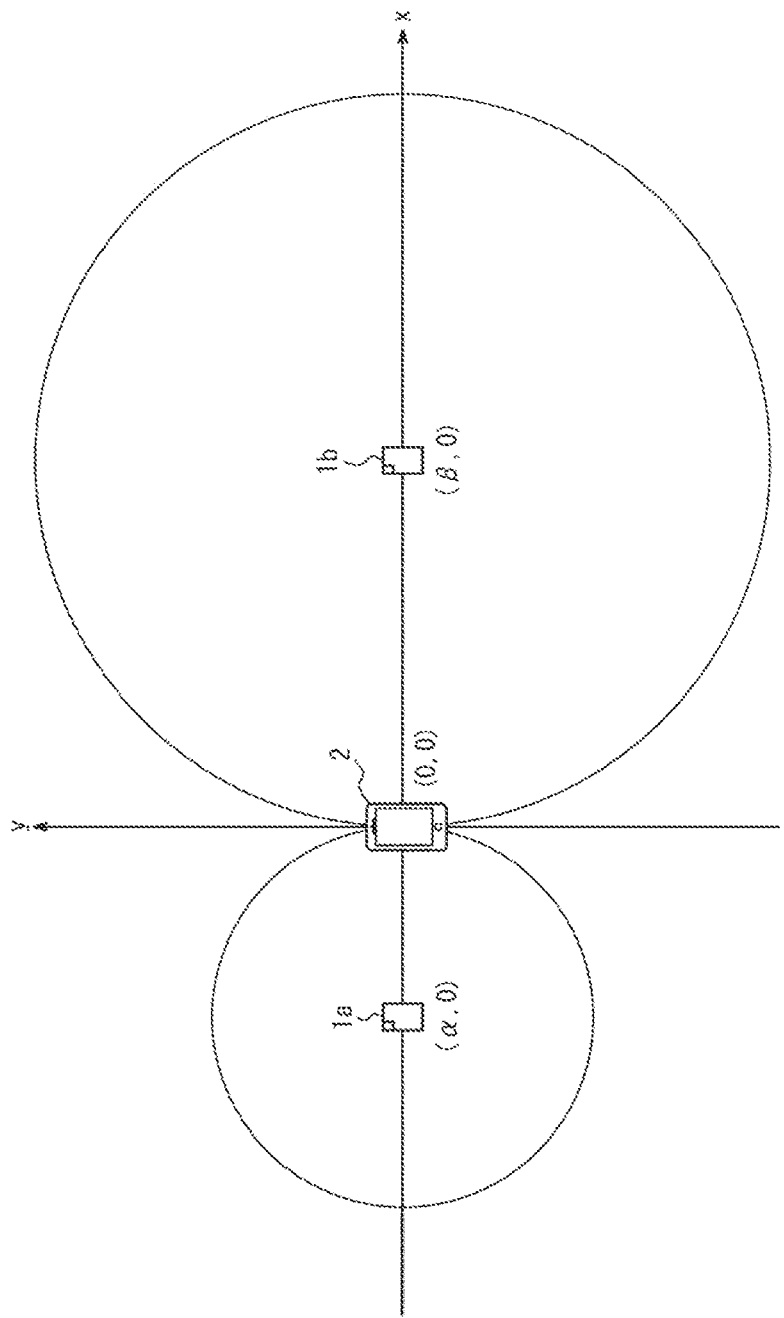
FIG. 4 is a diagram schematically showing definition of coordinates.

First, the information processing system S defines coordinates of the position of each transmission device 1. FIG. 4 schematically shows definition of the coordinates. Specifically, the terminal device 2 gives a notification to a user of the terminal device 2 using audio, screen display, or the like to urge the user to place the terminal device 2 on a straight line that passes through the first transmission device 1a and the second transmission device 1b. The terminal device 2 receives Bluetooth (registered trademark) radio waves transmitted from each transmission device 1 and measures the intensity of the radio waves. The terminal device 2 transmits measurement results to the management device 3. There is a positive correlation between a radio wave intensity and a distance. Therefore, the management device 3 calculates the distance between the terminal device 2 and each transmission device 1 from the measurement results received from the terminal device 2. The management device 3 sets coordinates of the position of the terminal device 2 to (0, 0), sets the straight line passing through the transmission devices 1 as an x axis, and sets a straight line that passes through the coordinates of the terminal device 2 and is perpendicular to the x axis as a y axis. The management device 3 determines coordinates of the transmission devices 1 in proportion to actual distances. Here, the management device 3 sets coordinates of the first transmission device 1a to ($\alpha$, 0) and sets coordinates of the second transmission device 1b to ($\beta$, 0). Note that the management device 3 may set the positive side and the negative side of each axis to suitable directions. When the setting is complete, the terminal device 2 notifies the user of the terminal device 2 that the terminal device 2 need not be placed at the place. By executing step A2 using radio waves as described above, the information processing system S can eliminate the labor of measuring and inputting the distance between the transmission devices 1 at the site even if positions of the transmission devices 1 are changed according to conditions of the site. Furthermore the information processing system S can define coordinates corresponding to absolute distances, which is necessary to detect approach of the moving object 2a to the work zone K or the like.

As an additional example of step A2, a configuration is also possible in which a device such as an alarm is installed at a suitable position in the work zone K before step A2, and a positional relationship between the alarm or the like and each transmission device 1 is stored in the management device 3. With this configuration, coordinates of the alarm or the like may be set in a coordinate system when the coordinate system defined by the management device 3 in step A2.

As an alternative example of step A2, a configuration is also possible in which the management device 3 does not execute definition of coordinates in step A2 described above if the distance between the terminal device 2 and each transmission device 1 is already known or can be measured. Instead of definition of coordinates described above, the terminal device 2 accepts input of coordinates of the transmission devices 1 (i.e., α and β) corresponding to the distance. The terminal device 2 transmits the input coordinate information to the management device 3. The management device 3 may set coordinates of the terminal device 2 based on the received coordinate information.

[Step A3]

When the moving object 2a approaches the transmission devices 1, the management device 3 detects that the terminal device 2 installed in the moving object 2a has received radio waves having an intensity greater than or equal to a predetermined value. The management device 3 may start the following position determination processing.

Figure 5A:
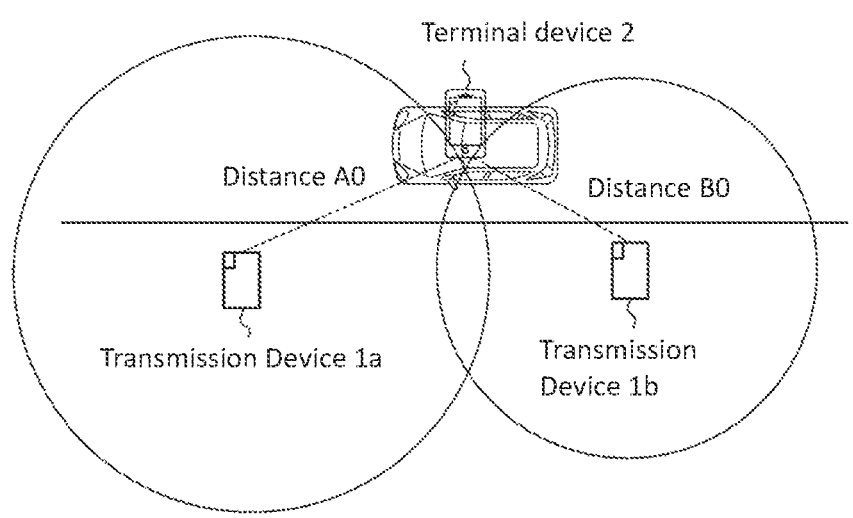
FIG. 5A is a diagram showing a method for determining a position at a point in time.

FIG. 5A schematically shows the position determination processing. The management device 3 sets a point in time at which the position determination processing is started to t0. At this time, the management device 3 has information regarding intensities of radio waves received from the first transmission device 1a and the second transmission device 1b. The management device 3 converts the intensities of radio waves to distances using a predetermined conversion formula. Here, it is assumed that the distance from the first transmission device 1a to the terminal device 2 is A0, and the distance from the second transmission device 1b to the terminal device 2 is B0, for example.

Figure 5B:
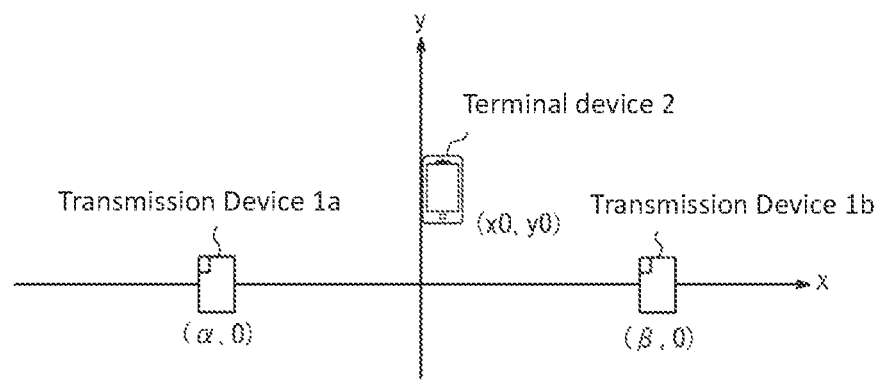
FIG. 5B is a diagram showing coordinates corresponding to FIG. 5A.

In the coordinate system defined in step A2, the management device 3 draws a circle that is centered on the first transmission device 1a and has a radius of A0 (or a size corresponding to the scale of the coordinate system) and a circle that is centered on the second transmission device 1b and has a radius of B (or a size corresponding to the scale of the coordinate system). Points on the same circumference are points at which the same radio wave intensity is measured. An intersection point between the two drawn circles is a candidate for the position at which the terminal device 2 is located, and is set as (x0, y0) in the coordinate system shown in FIG. 5B. Although the circles have two intersection points that respectively have a positive value and a negative value as the value of y0, the management device 3 may select either of the intersection points. In the present embodiment, a case will be described as an example in which the value of y0 is a positive value. If a positive value is selected, the management device 3 selects a positive value in the following step A4 as well. On the other hand, if a negative value is selected, the management device 3 selects a negative value in the following step A4 as well.

[Step A4]

Figure 5C:
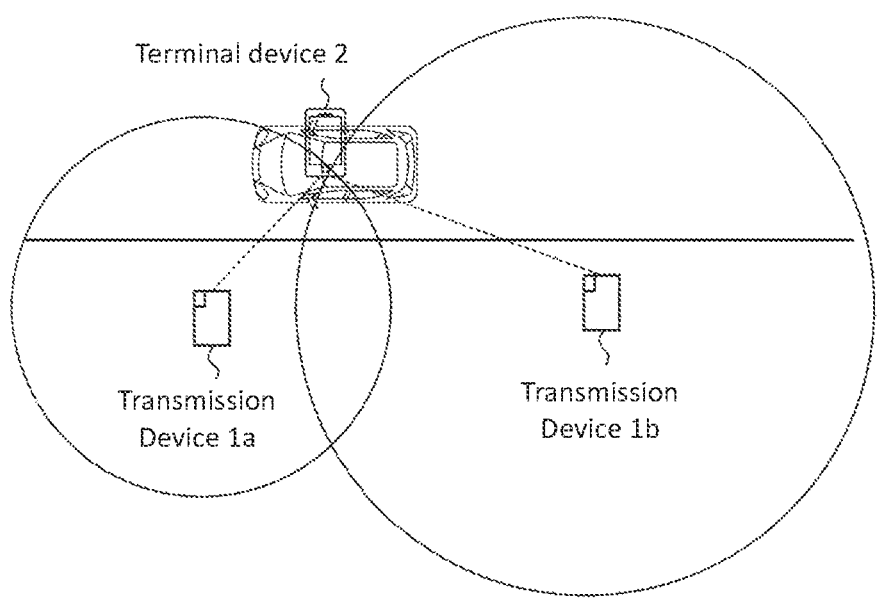
FIG. 5C is a diagram showing a method for determining a position at another point in time.
Figure 5D:
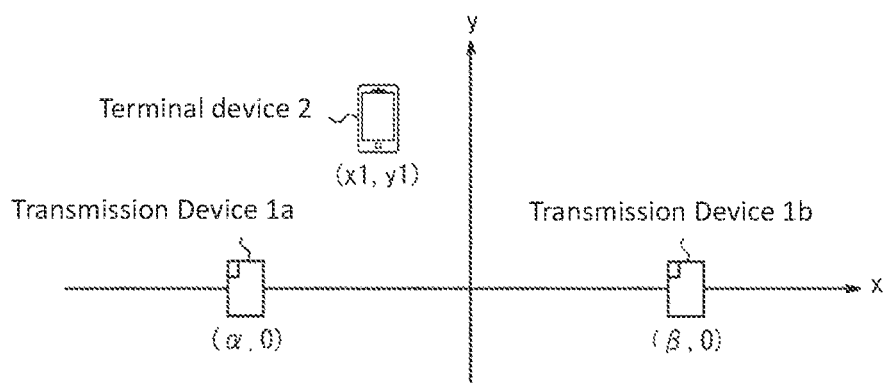
FIG. 5D is a diagram showing coordinates corresponding to FIG. 5C.

After a predetermined period of time (here, a period of time in which the moving object 2a does not go out of an area in which the moving object 2a can communicate with the transmission devices 1) has passed from the point in time t0, the management device 3 again draws circles as shown in FIG. 5C by again executing step A3 described above. As shown in FIG. 5D, the management device 3 acquires coordinates (x1, y1) of the terminal device 2 at a point in time t1.

[Step A5]

Figure 6:
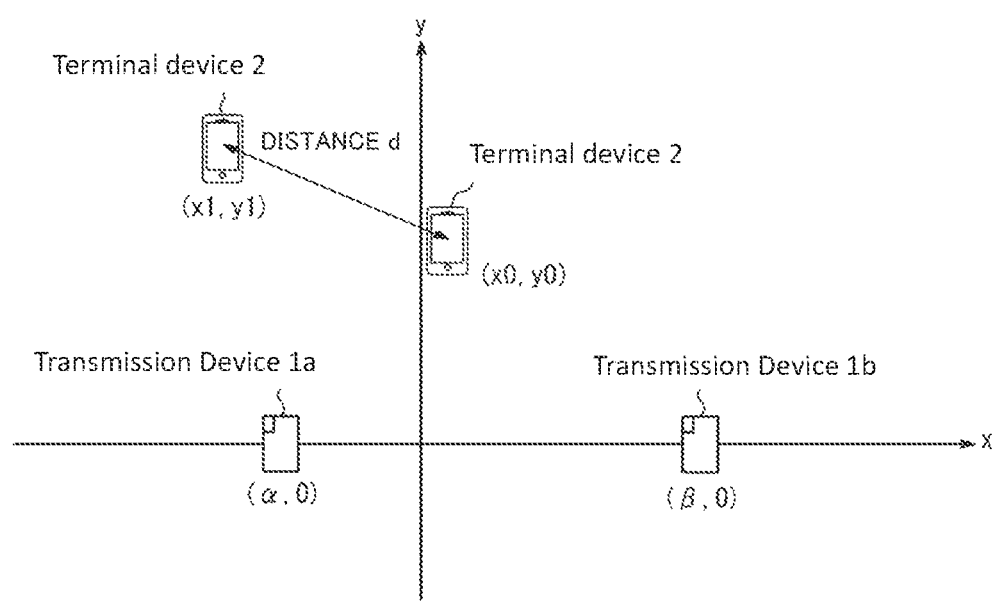
FIG. 6 is a diagram schematically showing a method for determining a speed.

The management device 3 calculates a distance and a speed from coordinate information acquired in steps A3 and A4. Specifically, the management device 3 calculates a distance d between two points shown in FIG. 6 using the following formula.

$$d=\sqrt{(y1-y0)^2+(x1-x0)^2}$$

The management device 3 calculates an actual distance d' by performing predetermined scale correction on the calculated distance d. Furthermore, the management device 3 calculates a speed s of the moving object 2a using the following formula.

$$s=d'/(t1-t0)$$

Thus, the management device 3 can find an actual speed of the moving object 2a.

In the case of one-side two-way traffic as shown in FIG. 1, if the moving object 2a is sufficiently far from the work zone K, it is hasty to determine that the possibility of collision is high, even if the speed of the moving object 2a is high. On the other hand, if the speed of the moving object 2a is low (e.g., if the moving object 2a is decelerated before reaching the work zone K), the possibility of collision can be determined as being low even if the moving object 2a is close to the work zone K. Therefore, the management device 3 can determine whether the possibility of collision is high or low as described below by using the calculated speed information and position information regarding the moving object 2a. That is, the management device 3 sets and stores a threshold value of the speed according to a distance between the position of the moving object 2a at the point in time t=1 and the position of the work zone K. The shorter the distance is, the smaller the threshold value of the speed can be set to be. The position of the work zone K may be manually input or set to the same position as an alarm or the like installed in the work zone K. The management device 3 compares the calculated speed and the threshold value, and if the calculated speed is lower than the threshold value, the management device 3 may determine that the moving object 2a will stop or change the traveling direction rightward before reaching the work zone K and accordingly, the possibility of collision is low. On the other hand, if the calculated speed is higher than or equal to the threshold value, the management device 3 may determine that the moving object 2a is unlikely to avoid the work zone K and accordingly, the possibility of collision is high. At this time, the management device 3 transmits warning information indicating that the possibility of collision is high to an alarm (speaker, monitor, etc.) installed in the vicinity of the work zone K, a mobile terminal held by a worker in the work zone K, or the terminal device 2. A terminal that has received the warning information can output the warning information using audio, screen display, or the like to reduce accidents resulting in injury or death.

The management device 3 can execute the processing described above with respect to following moving objects 2a. In this case, speed information and position information are stored for each moving object 2a. Therefore, the present invention can be applied to following vehicles as well.

[Confirmation Experiment]

An experiment (simulation) was carried out with respect to the information processing system S described above. A relational expression between a radio wave intensity and a distance used in the experiment is shown below.

$$d = 10^{\frac{(T-R)}{10n}}$$

In this expression, d [m] represents a distance, T [dB] represents an intensity of radio waves emitted by a transmission device, and R [dB] represents an intensity of radio waves received by the terminal device 2. This expression is obtained by applying a parameter that is suited to the environment of the experiment to the Friis transmission equation that indicates that the intensity of a received signal is inversely proportional to the square of a distance in a free space. In this expression, n represents a coefficient that can vary according to the model of the terminal device 2 or the presence or absence of an obstacle. In the environment of this experiment, n was set to 2.79, and T was set to −57.

In the following description, the management device 3 converts a radio wave intensity to a distance using the relational expression described above. Alternatively, if there is another relational expression between a radio wave intensity and a distance (found through experience, for example), the management device 3 may use the expression.

[Step B1]

In this experiment, the information processing system S shown in FIG. 3A described above was used. Two transmission devices 1 were used.

[Step B2]

Figure 7:
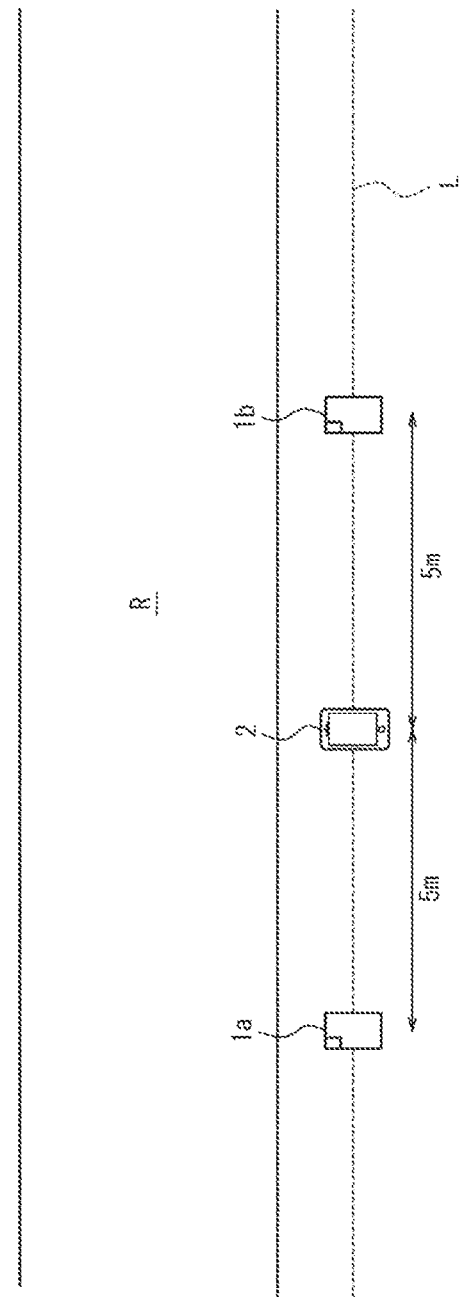
FIG. 7 is a schematic diagram showing a confirmation experiment.
Figure 9:
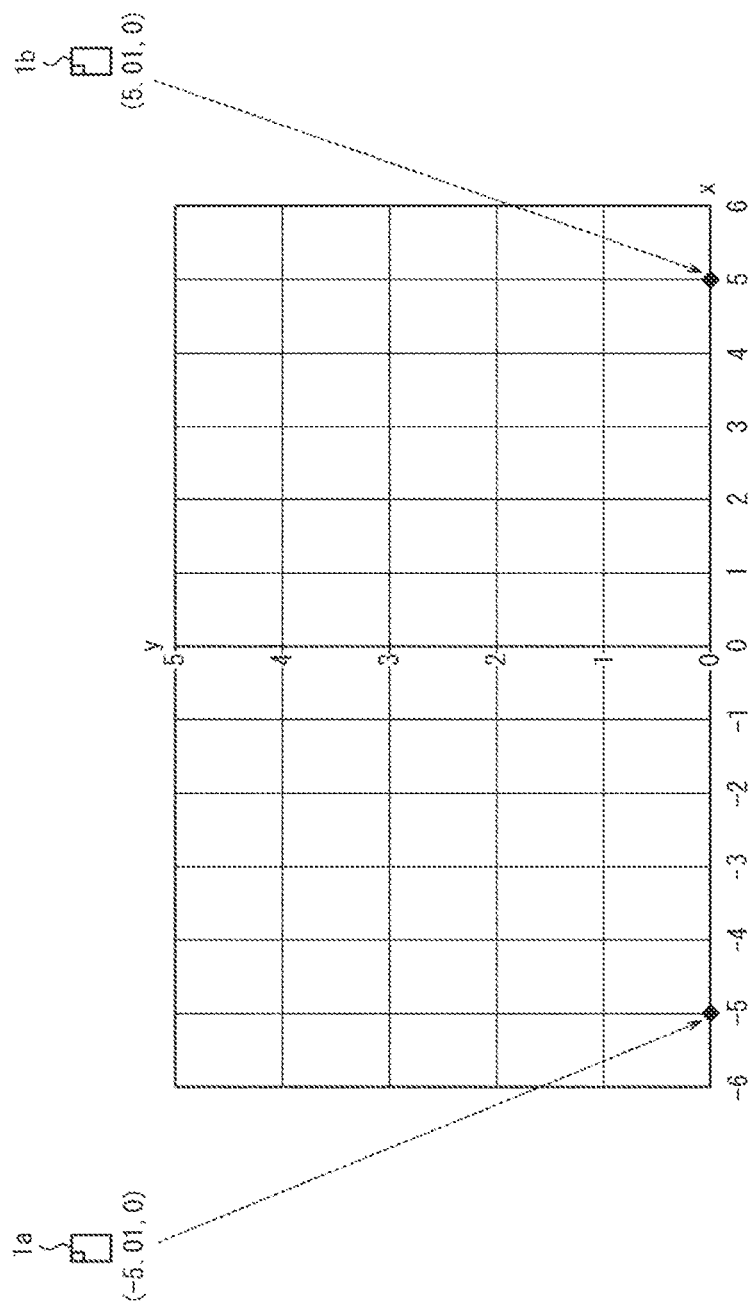
FIG. 9 is a diagram showing coordinates defined in the confirmation experiment.

FIG. 7 shows an installed state of the transmission devices 1. As shown in FIG. 7, the transmission devices were installed such that the first transmission device 1a, the terminal device 2, and the second transmission device 1b were arranged on the same straight line L and the straight line L was parallel to a lane R. The distance between each transmission device 1 and the terminal device 2 was 5 m. Radio wave intensities and distances were measured four times. FIG. 8 shows the measured radio wave intensities and distances calculated from the radio wave intensities. As shown in FIG. 8, an average value of the distances was 5.01 m. That is, in the experiment, the management device 3 could obtain values that were almost the same as the actual distance. FIG. 9 shows coordinates that were defined based on the values obtained through the measurement. Here, each graduation in the coordinate system corresponds to an actual distance of 1 m.

[Step B3]

Following step B2, an experiment was further carried out with an arrangement shown in FIG. 10A. In this experiment, the terminal device 2 first moved leftward in FIG. 10A along a track T that was parallel to a straight line passing through the transmission devices 1, assuming a lane. The terminal device 2 changed the course at a position where the terminal device 2 came closest to the second transmission device 1b, and moved diagonally forward to the right with respect to the travelling direction along the track T. In this confirmation experiment, the position where the terminal device 2 came closest to the second transmission device 1b was set to a position that was 3 m away from the second transmission device 1b in a direction perpendicular to the straight line L to make verification easy. At this time, the terminal device 2 received radio waves of at least −71 dB from the second transmission device 1b, and the information processing system S started a processing flow. Assume that this point in time was t=0. The speed of the terminal device 2 at this point in time was about 40 km/h. As shown in FIG. 10A, the terminal device 2 passed a position that was 6 m away from the first transmission device 1a in the direction perpendicular to the straight line L at a point in time t=1 that was one second later from t=0.

FIG. 10B shows radio wave intensities and calculated distances obtained through this experiment. There are small differences between actual distances and the calculated distances. However, these differences are relatively small and do not matter when the information processing system S is applied to a road.

Figure 11:
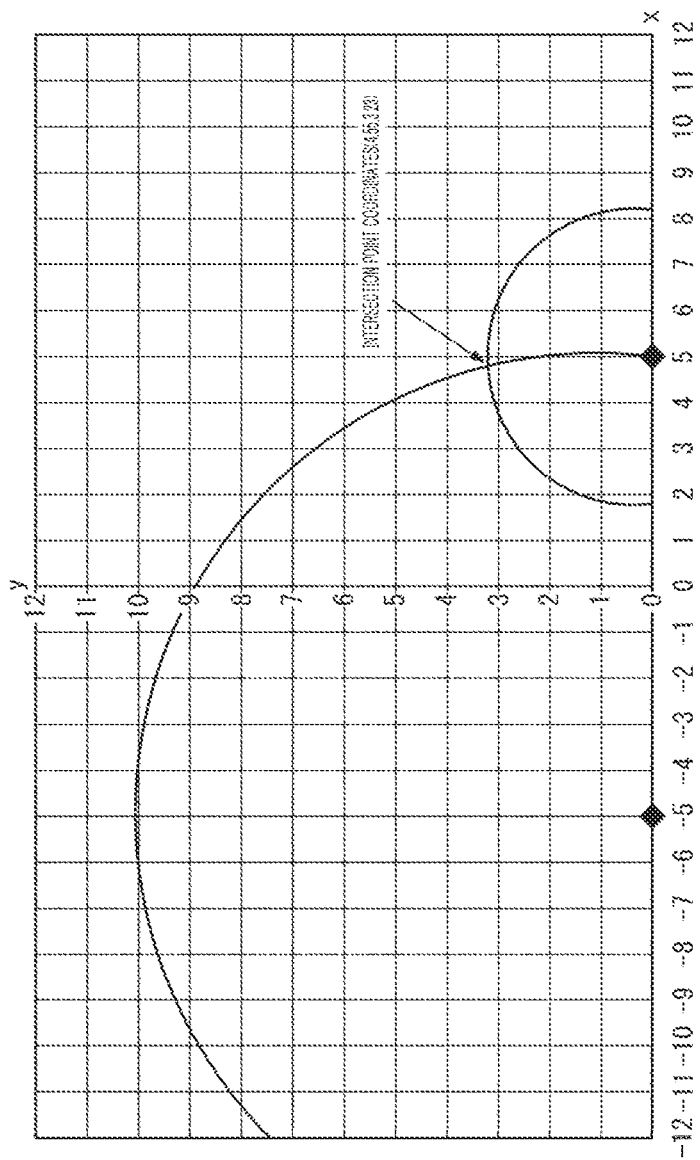
FIG. 11 is a diagram showing circles drawn in a coordinate system with respect to a point in time.

As shown in FIG. 11, the management device 3 draws circles in the coordinate system based on the calculated distances at the point in time t=0. Coordinates of an intersection point between the two circles are (4.55, 3.23).

[Step B4]

Figure 12:
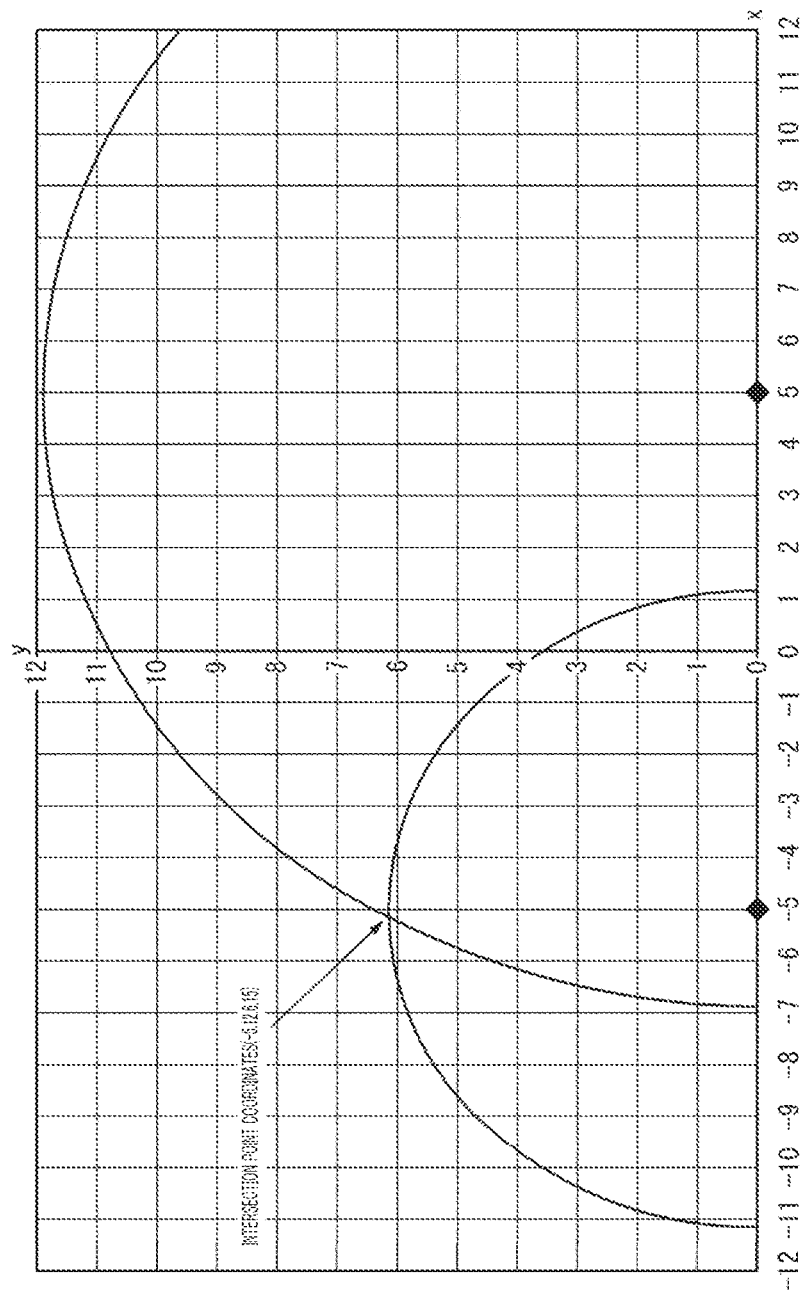
FIG. 12 is a diagram showing circles drawn in the coordinate system with respect to another point in time.

As shown in FIG. 12, the management device 3 draws circles in the coordinate system based on the calculated distances at the point in time t=1. Coordinates of an intersection point between the two circles are (−5.12, 6.15).

[Step B5]

Figure 13A:
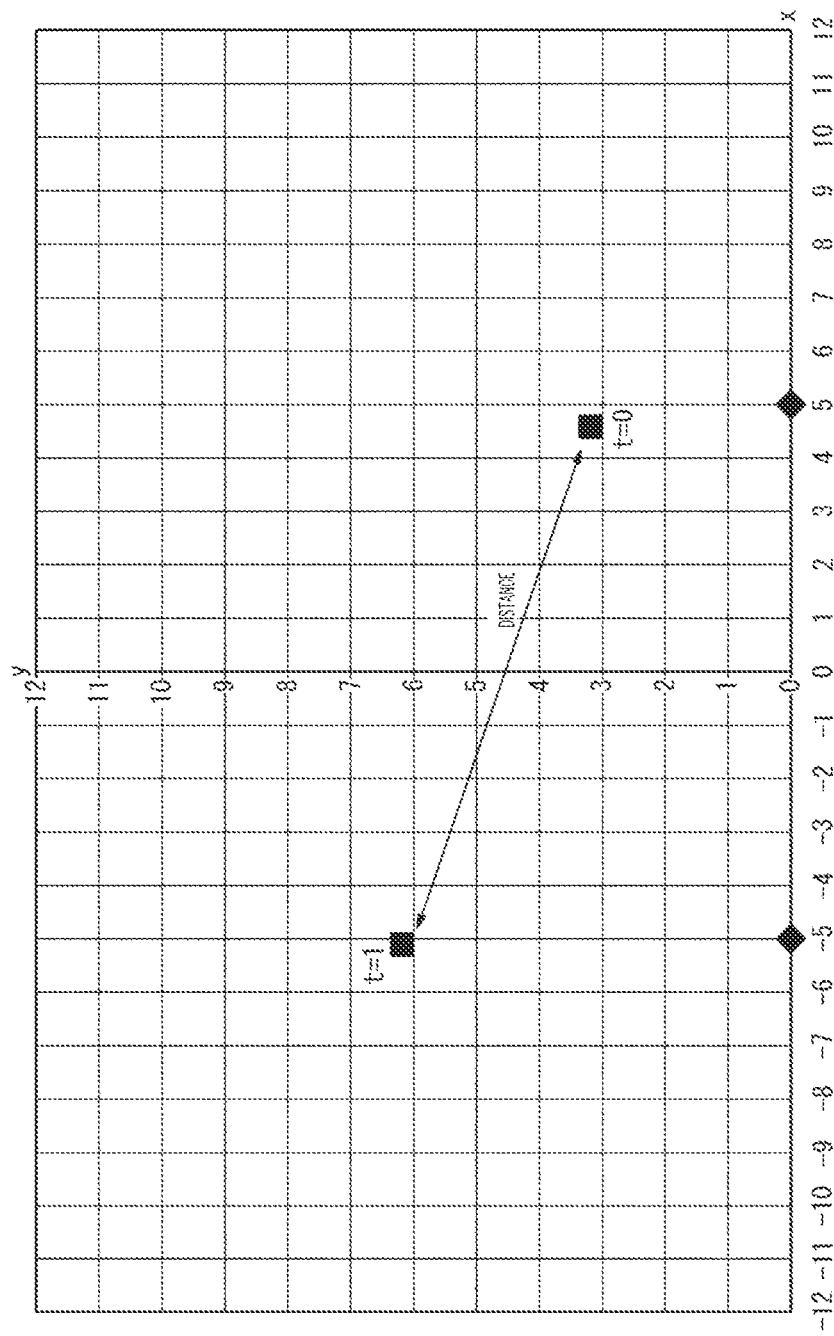
FIG. 13A is a diagram showing a distance by which the terminal device moved in the coordinate system.

FIG. 13A shows the two intersection points found in steps B3 and B4. The management device 3 calculates a distance between the coordinates at the point in time t=0 and the coordinates at the point in time t=1 and a speed of the terminal device 2 moved the distance. FIG. 13B shows calculation results. As shown in FIG. 13B, the distance between the two points is 11.3 m and is almost the same as an actual distance of 10.44 m. A speed calculated by performing scale correction is 40.6 km/h and is almost the same as an actual speed of 40 km/h. A difference occurred between the calculated speed and the actual speed presumably because it was difficult to move the terminal device 2 while keeping the actual speed at 40 km/h.

Figure 14:
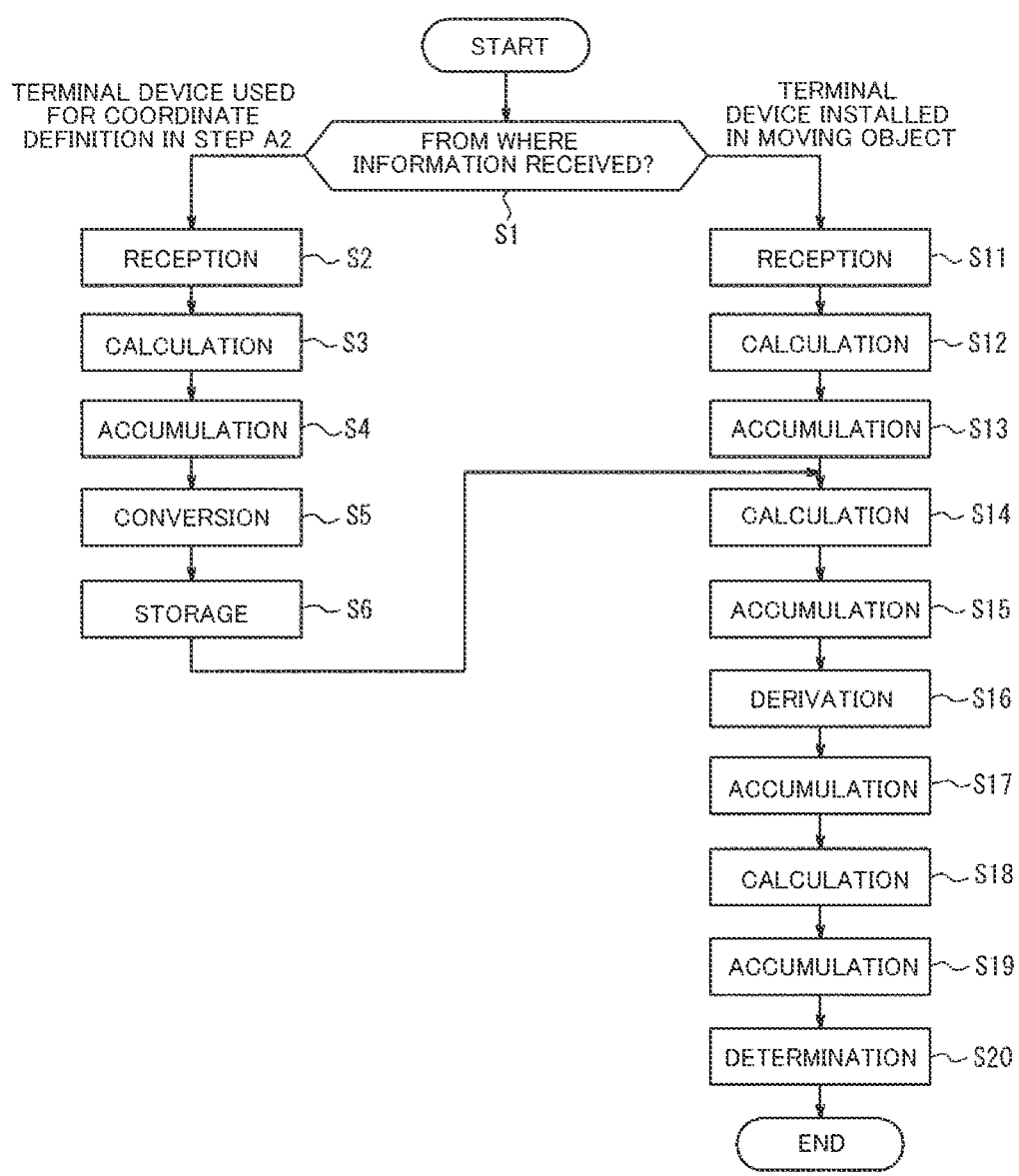
FIG. 14 is a diagram showing a flowchart of processing executed by the management device.

FIG. 14 shows a flowchart of processing executed by the management device 3.

In step S1, the information determination unit 31 of the management device 3 determines from which terminal radio wave intensity information and time information have been received.

If it is determined by the management device 3 that the information has been received from a terminal device 2 that is used in defining coordinates in step A2, the receiving unit 32 receives the information from the information determination unit 31 in step S2.

In step S3, the conversion calculation unit 33 converts a radio wave intensity to a distance.

In step S4, the distance/time information accumulation unit 34 accumulates the distance calculated in step S3 and the time information.

In step S5, the coordinate conversion unit 35 converts a positional relationship between the terminal device 2 and each transmission device 1 to coordinates.

In step S6, the recording unit 36 defines coordinates of the terminal device 2 and each transmission device 1. For example, coordinates of the terminal device 2, the first transmission device 1a, and the second transmission device 1b are set to (0, 0), (α, 0), and (β, 0), respectively. The recording unit 36 records content of the setting and gives the content to the coordinate distance calculation unit 37. The management device 3 executes steps S14 to S20 described below.

On the other hand, if it is determined in step S1 by the information determination unit 31 that the information has been received from a terminal device 2 that is installed in a moving object 2a, the receiving unit 32 receives the information from the information determination unit 31 in step S11.

In step S12, the conversion calculation unit 33 performs calculation to convert a radio wave intensity to a distance.

In step S13, the distance/time information accumulation unit 34 accumulates the distance calculated in step S12 and the time in In step S14, the coordinate distance calculation unit 37 sets a coordinate system using a suitable method, and calculates distances between the terminal device 2 and the respective transmission devices 1 in the coordinate system.

In step S15, the coordinate distance/time information accumulation unit 38 records the distances calculated in step S14 and a point in time corresponding to the distances.

In step S16, the derivation unit 39 draws circles in the coordinate system using the distances recorded in step S15, and derives coordinates of an intersection point between the circles. The derivation unit 39 derives coordinates of an intersection point for each point in time.

In step S17, the coordinate distance/time information accumulation unit 38 records coordinates of intersection points derived for respective points in time in step S16.

In step S18, the speed calculation unit 40 calculates a speed of the terminal device 2 from the coordinates of the plurality of intersection points recorded for the respective points in time in step S17. The calculation is performed using the method described above, and therefore, a description of the method is omitted here.

In step S19, the speed information accumulation unit 41 accumulates the speed calculated in step S18.

In step S20, the collision possibility determination unit 42 determines the possibility of collision from speed information accumulated in step S18 and position information accumulated in step S15. The determination is performed using the method described above, and therefore, a description of the method is omitted here.

As described above, according to the present embodiment, the terminal device 2 measures intensities of radio waves received from the plurality of transmission devices 1 at predetermined times, and transmits measurement results to the management device 3. The management device 3 calculates distances between the terminal device 2 and each of the transmission devices 1 at the predetermined times from the measurement results, and calculates positions of the terminal device 2 at the predetermined times from the calculated distances. With this configuration, the management device 3 can estimate the course of the terminal device 2 by finding the position and the speed of the terminal device 2. Furthermore, the management device 3 can reduce accidents by executing the estimation with respect to following terminal devices 2.

Also, according to the present embodiment, the terminal device 2 is installed in the moving object 2a, and the management device 3 determines the possibility of the moving object 2a colliding with an obstacle on a travelling route from the calculated position and the calculated speed. With this configuration, the management device 3 can reduce accidents.

Also, according to the present embodiment, the management device 3 stores a position of an obstacle, sets a threshold value of the speed according to a positional relationship between the terminal device 2 and the obstacle, and determines the possibility of the moving object 2a colliding with the obstacle by comparing the speed of the terminal device 2 and the threshold value. With this configuration, the management device 3 can more accurately estimate the course while reducing erroneous determinations.

Also, according to the present embodiment, upon determining that the possibility of collision is high, the management device 3 transmits warning information indicating that the possibility of collision is high, to the terminal device 2. The terminal device 2 outputs the warning information. With this configuration, the management device 3 can reduce accidents.

In the embodiment described above, the transmission devices 1 are installed only on one side of a road (i.e., on the left side with respect to the travelling direction of the moving object 2a). However, the transmission devices 1 may be installed on both sides of a road (i.e., in the opposite lane as well) in another embodiment. In this case, the management device 3 can acquire distance data in mutually opposite phases from the transmission devices 1 installed on the both sides, and therefore can more accurately estimate the course of the terminal device 2 and more accurately determine the possibility of collision.

In the embodiment described above, the management device 3 determines the possibility of collision from a position and a speed of the moving object 2a. In another embodiment, the management device 3 may further determine the travelling direction of the moving object 2a and determine the possibility of collision based on the travelling direction. Specifically, even in a case where the possibility of collision is determined as being high based on the position and the speed of the moving object 2a in the embodiment described above, in another embodiment, the management device 3 may determine that the possibility of collision is low, if the travelling direction of the moving object 2a is such that the moving object 2a avoids the work zone K.

The management device 3 according to the present embodiment can also be realized using a suitable computer and a Program. Specifically, a program in which content of processing for realizing the functions of the management device 3 is written is recorded in a recording medium such as a memory, and a processor is caused to read out and execute the program. Such a program can also be provided via a network.

Also, the program may be recorded in a computer-readable medium. The program can be installed in a computer using the computer-readable medium. Here, the computer-readable medium in which the program is recorded may also be a non-transitory recording medium. Although there is no specific limitation on the non-transitory recording medium, the non-transitory recording medium may be a recording medium such as a CD-ROM or a DVD-ROM.

Although the present invention has been described based on the drawings and the examples, it should be easy for those skilled in the art to make various changes and modifications based on the present disclosure. It should be noted that accordingly, such changes and modifications are encompassed in the scope of the present invention. For example, functions and the like included in constitutional units or steps can be rearranged such that no logical contradiction occurs, and a plurality of constitutional units or steps can be combined into a constitutional unit or a step, or each constitutional unit or step can be divided.

REFERENCE SIGNS LIST

S Information processing system
1 (1a, 1b) Transmission device
2 Terminal device
21 Storage unit
22 Control unit
23 Communication unit
2a Moving object
3 Management device
31 Information determination unit
32 Receiving unit
33 Conversion calculation unit
34 Distance/time information accumulation unit
35 Coordinate conversion unit
36 Recording unit
37 Coordinate distance calculation unit
38 Coordinate distance/time information accumulation unit
39 Derivation unit
40 Speed calculation unit
41 Speed information accumulation unit
42 Collision possibility determination unit

The invention claimed is:

1. An information processing system comprising a processor configured to execute operations comprising:
receiving, by the processor at a first point, a first intensity of a first radio wave from a second point at a predetermined time, wherein the first point is moving, and the second point is stationary;
receiving, by the processor at the first point, a second intensity of a second radio wave from a third point at the predetermined time, wherein the third point is stationary and is distinct from the second point;
transmitting, by the processor, to a fourth point, measurement results based on the first intensity of the first radio wave and the second intensity of the second radio wave, wherein the fourth point is distinct from the second point and the third point;
causing determining at the fourth point, a first distance between the first point and the second point and a second distance between the first point and the third point at the predetermined time;
causing determining at the fourth point, based at least on the first distance and the second distance, a position of the first point at the predetermined time, and
outputting, by the processor at the first point, based at least on a combination including the position of the first point and a speed according to a positional relationship between the first point and an obstacle, a warning information, wherein the warning information indicates the first point colliding with the obstacle.

2. The information processing system according to claim 1, wherein the causing determining the position of the first point further comprises causing determining a first speed of the first point moving from the determined position of the first point at the predetermined time.

3. The information processing system according to claim 2, wherein the first point is a part of a moving object, and the causing determining the position of the first point further comprises causing determining the moving object colliding with the obstacle on a travelling route from the position of the first point and the first speed of the first point moving from the determined position.

4. The information processing system according to claim 3, wherein the causing determining the position of the first point further comprises causing:
storing a first position of the obstacle,
setting a threshold value of the speed according to the positional relationship between the first point and the obstacle, and
determining the moving object colliding with the obstacle by comparing the first speed of the first point moving from the determined position and the threshold value.

5. The information processing system according to claim 4, the measurement results further comprise the warning information, wherein the warning information indicates the first point colliding with the obstacle, and
the processor further configured to execute the operations comprising:
outputting, by the processor at the first point, the warning information.

6. The information processing system according to claim 3, wherein the measurement results further comprise the warning information, wherein the warning information indicates that the moving object colliding with the obstacle; and
the processor further configured to execute the operations comprising:
outputting, by the processor at the first point, the warning information.

7. A computer implemented method, comprising:
receiving, by a processor at a first point, a first intensity of a first radio wave from a second point at a predetermined time, wherein the first point is moving, and the second point is stationary;
receiving, by the processor at the first point, a second intensity of a second radio wave from a third point at the predetermined time, wherein the third point is stationary is distinct from the second point;
transmitting, by the processor, to a fourth point, measurement results based on the first intensity of the first radio wave and the second intensity of the second radio wave, wherein the fourth point is distinct from the second point and the third point;
causing determining, at the fourth point, a first distance between the first point and the second point and a second distance between the first point and the third point at the predetermined time;
causing determining at the third point, based at least on the first distance and the second distance, a position of the first point at the predetermined time; and
outputting, by the processor at the first point, based at least on a combination including the position of the first point and a speed according to a positional relationship between the first point and an obstacle, a warning information, wherein the warning information indicates the first point colliding with the obstacle.

8. The computer implemented method according to claim 7, wherein the causing determining the position of the first point further comprises causing determining a first speed of the first point moving from the determined position of the first point at the predetermined time.

9. The computer implemented method according to claim 8, wherein the first point is a part of a moving object, and the causing determining the position of the first point further comprises causing determining the moving object colliding with the obstacle on a travelling route from the position of the first point and the first speed of the first point moving from the determined position of the first point at the predetermined time.

10. The computer implemented method according to claim 9, wherein the causing determining the position of the first point further comprises causing:
- storing a first position of the obstacle,
- setting a threshold value of the speed according to the positional relationship between the first point and the obstacle, and
- determining the moving object colliding with the obstacle by comparing the first speed of the first point moving from the determined position and the threshold value.

11. The computer implemented information processing method according to claim 10, wherein
- the measurement results further comprise the warning information, wherein the warning information indicates that the first point colliding with the obstacle, and
- the method further comprising:
- displaying the warning information.

12. The computer implemented method according to claim 9, wherein
- the measurement results further comprise the warning information, wherein the warning information indicates that the first point colliding with the obstacle, and
- the method further comprising:
- displaying the warning information.

13. A management device comprising a processor configured to execute operations comprising:
- receiving, by the processor at a first point, a first intensity of a first radio wave from a second point at a predetermined time, wherein the first point is moving, and the second point is stationary;
- receiving, by the processor at the first point, a second intensity of a second radio wave from a third point at the predetermined time, wherein the third point is stationary is distinct from the second point;
- transmitting, by the processor at the first point, to a fourth point, measurement results based on the first intensity of the first radio wave and the second intensity of the second radio wave, wherein the fourth point is distinct from the second point and the third point;
- causing determining, at the fourth point, a first distance between the first point and the second point and a second distance between the first point and the third point at the predetermined time;
- causing determining at the fourth point, based at least on the first distance and the second distance, a position of the first point at the predetermined time; and
- outputting, by the processor at the first point, based at least on a combination including the position of the first point and a speed according to a positional relationship between the first point and an obstacle, a warning information, wherein the warning information indicates the first point colliding with the obstacle.

* * * * *